(No Model.)
T. FLYNN & H. O. NORTON.
LAMP STANDARD.
No. 534,742. Patented Feb. 26, 1895.
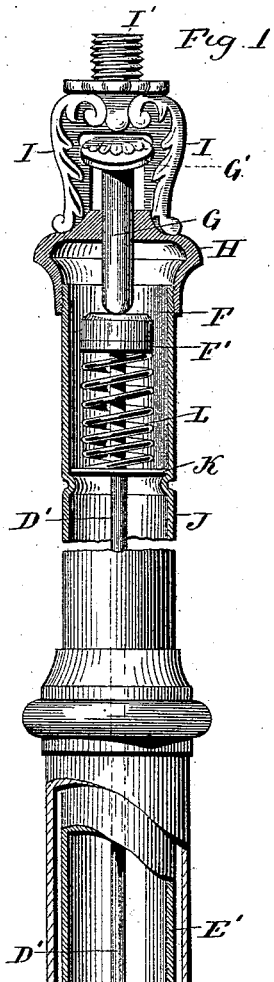
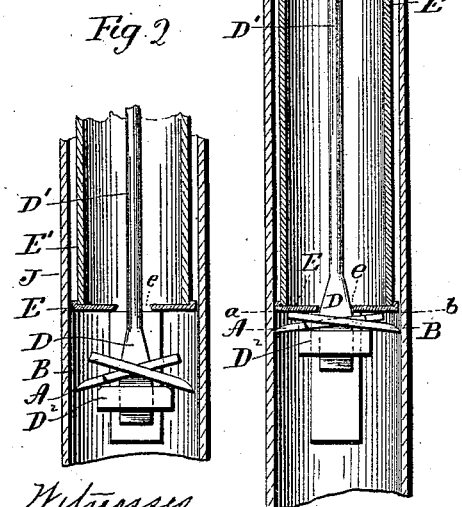
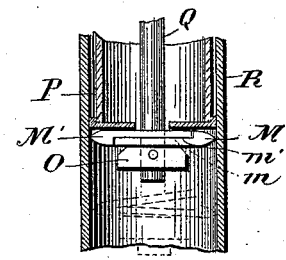
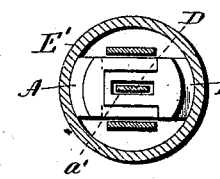
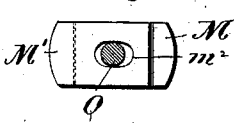
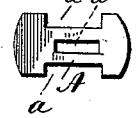
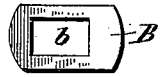
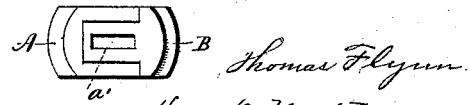

UNITED STATES PATENT OFFICE.

THOMAS FLYNN AND HENRY O. NORTON, OF WATERBURY, CONNECTICUT, ASSIGNORS TO THE MATTHEWS & WILLARD MANUFACTURING COMPANY, OF SAME PLACE.

LAMP-STANDARD.

SPECIFICATION forming part of Letters Patent No. 534,742, dated February 26, 1895.

Application filed April 9, 1894. Serial No. 506,895. (No model.)

*To all whom it may concern:*

Be it known that we, THOMAS FLYNN and HENRY O. NORTON, of Waterbury, in the county of New Haven and State of Connecticut, have invented a new Improvement in Lamp-Standards; and we do hereby declare the following, when taken in connection with the accompanying drawings and the letters of reference marked thereon, to be a full, clear, and exact description of the same, and which said drawings constitute part of this specification, and represent, in—

Figure 1, a view partly in elevation and partly in vertical section of a lamp-standard constructed in accordance with our invention, and showing the clutch-plates in engagement for supporting the inner tube of the standard; Fig. 2, a similar detail view showing the clutch-plates in their retired positions; Fig. 3, a view of the device in horizontal section on the line $a-b$ of Fig. 1; Fig. 4, a detached plan view of one clutch plate; Fig. 5, a corresponding view of the other plate; Fig. 6, a plan view showing the two plates interlocked and projected as for clutching the stationary tube; Fig. 7, a broken view partly in section showing one of the modified forms which the plates may assume; Fig. 8, a plan view of the plates.

Our invention relates to an improvement in clutches for the adjustable tubes of the standards of that class of lamps which are known as piano lamps, the object being to provide a simple, durable, reliable and effective clutch for holding the inner tube which supports the lamp, in any desired position of vertical adjustment with respect to the outer tube, which is supported from the floor.

With these ends in view, our invention consists in a clutch having certain details of construction and combinations of parts as will be hereinafter described and pointed out in the claims.

As shown in Figs. 1 to 6 of the drawings, our improved clutch comprises two horizontally arranged, longitudinally movable, interlocked clutch-plates A and B, each having rounded ends corresponding to the curvature of the stationary outer tube C, the former having an elongated rectangular opening $b$, located slightly to one side of its longitudinal center, and the latter having its opposite sides cut away, as at $a\ a$, to adapt it to pass through the slot $b$ of the plate B, and also having a narrow longitudinal opening $a'$ located slightly to one side of its longitudinal center, for the reception of the flattened lower end D of the operating-rod D' of the standard. A supporting piece $D^2$ secured to the lower end of the said flattened end D of the rod D' supports the clutch plates thereon, and lifts them when the rod is lifted against the cap E, applied to the lower end of the vertically movable or telescoping inner tube E', the said cap being constructed with a central opening $e$, through which the said flattened end D of the rod D' passes. The said rod D' is extended upward nearly to the top of the vertically movable tube E', and provided with screw-threads adapting it to receive a button F, which is impinged upon by the lower end of a vertically arranged push-pin G, mounted in a cap H, screwed upon the upper end of the said tube, the said pin being furnished at its upper end with a finger-piece G', inclosed between two brackets or scrolls I I, connected at their lower ends with the cap H, and supporting at their upper ends a screw-stud I' which provides for the application to the standard of the lamp-fount.

An internal annular rib J, formed near the upper end of the vertically movable tube E' by setting a portion of the said tube inward, provides a support for a washer K, which in turn supports the lower end of a spiral operating spring L, the upper end of which impinges against a nut F' mounted on the threaded upper end of the operating-rod D', at a point directly below the button F, before mentioned. The force of this spring exerts a constant effort to lift the rod, and hence compress and clamp the clutch plates between the cap E, and the supporting piece $D^2$ before mentioned, whereby the said plates are extended or projected so as to cause them to bite into the inner face of the stationary tube C. When, however, the operating-rod is depressed against the force of the spring L, through the medium of the push-pin G, and the plates moved away from the cap E, they will each lift and slide upon the other, as shown by Fig. 2, so as to release their grip upon the inner surface of the stationary tube. As long, therefore as the operating-rod is depressed, and the plates are held away from the cap E, and permitted to lift, the vertically movable inner tube B' may be moved freely up and down; but just as soon as the pressure upon the push-finger G' is removed, the spring L will assert itself to lift the rod and draw the plates against the cap E, whereby they will be forced to collapse, and are thus projected into engagement with the outer tube so as to grip the same and support the inner tube and the lamp fixed thereto.

In the modification shown by Figs 7 and 8 of the drawings, the two clutch-plates M and and M' instead of being adapted to be interlocked, have their contiguous faces recessed, as at $m$ $m'$ so that the two plates fit together. Each of these plates is provided with an elongated central opening $m^2$, for the reception of the lower end of the operating-rod M, which is provided at its extreme lower end with a supporting piece O. When these plates are drawn up against the cap P applied to the lower end of the vertically movable inner tube Q, they will be brought into line, in which position they will bite into the inner face of the stationary tube R. When, however, the operating-rod N is depressed against the force of the spring which normally lifts it, the plates will tilt, as shown by broken lines in Fig. 7, and so release their hold upon the said stationary tube.

We would, therefore, have it understood that we do not limit ourselves to the exact construction herein shown and described, but hold ourselves at liberty to make such changes and alterations as fairly fall within the spirit and scope of our invention. Thus, it is apparent that the particular forms of plates and the means of supporting them upon the lower end of the rod may be varied. It is obvious, furthermore, that the particular arrangement and location of the spring for lifting the operating-rod, and the means for depressing the same may be changed.

We are well aware that it is old to construct a lamp standard with a stationary outer tube and a vertically movable inner tube, and with an operating rod normally lifted by a spring, and adapted to be manually depressed, and provided at its lower end with a clutch composed of two dogs arranged to take hold of the inner surface of the stationary tube, and we do not claim such construction broadly, but only our particular clutch.

Having fully described our invention, what we claim as new, and desire to secure by Letters Patent, is—

1. In a lamp-standard, the combination with a stationary and a vertically movable tube, of a spring-lifted operating-rod located within the said vertically movable tube, two horizontally movable clutch-plates having openings to permit the said rod to be passed downward through them, and adapted at their outer ends to bite into the inner surface of the stationary tube, and means located upon the rod at a point below the plates for supporting the same, and whereby the said plates are brought together and forced outward to bite into the inner surface of the stationary tube by the elevation of the rod which lifts them against the lower end of the movable tube, and whereby also they are permitted to move inward and upward and release their hold upon the stationary tube when the rod is depressed, substantially as described.

2. In a lamp-standard, the combination with a stationary and a vertically movable tube, of a spring-lifted operating-rod located within the vertically movable tube, two horizontally arranged, longitudinally movable interlocked clutch-plates, one of which has a central opening for the reception of the other plate which has a central opening for the downward passage through it of the lower end of the rod, and means connected with the said rod at a point below the plates for supporting the same, substantially as set forth, and whereby the said plates are brought together and forced outward to bite into the inner surface of the stationary tube by the elevation of the rod which lifts them against the lower end of the movable tube, and whereby also they are permitted to move inward and upward and release their hold upon the stationary tube when the rod is depressed, substantially as described.

In testimony whereof we have signed this specification in the presence of two subscribing witnesses.

THOMAS FLYNN.
HENRY O. NORTON.

Witnesses:
GEO. H. COWELL,
JOHN C. MILLER.